United States Patent [19]

Dundas

[11] Patent Number: 5,054,272
[45] Date of Patent: Oct. 8, 1991

[54] METHOD FOR SEALING BLOW MOLDED BOTTLE

[75] Inventor: Dennis L. Dundas, Dover, Pa.

[73] Assignee: Graham Engineering Corporation, York, Pa.

[21] Appl. No.: 562,716

[22] Filed: Aug. 6, 1990

[51] Int. Cl.⁵ .......................... B29C 17/07; B65B 7/16
[52] U.S. Cl. ...................................... 53/561; 53/300; 53/511; 425/525
[58] Field of Search .................. 53/561, 122, 285, 300, 53/511, 510, 381.2; 425/525, 526

[56] References Cited

U.S. PATENT DOCUMENTS

| | | | |
|---|---|---|---|
| 3,359,602 | 12/1967 | Bailey | 18/35 |
| 3,369,690 | 2/1968 | Hayes | 125/100 |
| 3,479,793 | 11/1969 | Evers | 53/112 |
| 3,597,793 | 8/1971 | Weiler et al. | 18/5 |
| 3,669,602 | 6/1972 | Hansen | 53/561 X |
| 3,674,405 | 7/1972 | Hansen | 425/308 |
| 3,690,803 | 9/1972 | Pechtold et al. | 425/326 |
| 3,717,430 | 2/1973 | Hansen | 425/392 |
| 3,765,144 | 10/1973 | Schiesser | 53/39 |
| 3,851,029 | 11/1974 | Cornett, III et al. | 425/525 X |
| 3,897,670 | 8/1975 | Hansen | 53/29 |
| 3,957,168 | 5/1976 | Shine et al. | 215/1 |
| 4,097,570 | 6/1978 | Dickson et al. | 425/525 X |
| 4,337,025 | 6/1982 | Pagels et al. | 425/392 |
| 4,425,090 | 1/1984 | Hansen | 425/503 |
| 4,540,542 | 9/1985 | Weiler | 264/524 |
| 4,671,763 | 6/1987 | Weiler | 425/525 |
| 4,707,966 | 11/1987 | Weiler et al. | 53/410 |

Primary Examiner—James F. Coan
Attorney, Agent, or Firm—Thomas Hooker

[57] ABSTRACT

A machine and method for sealing closed an integral neck of blow molded bottle and simultaneously forming an integral twist-off.

25 Claims, 6 Drawing Sheets

METHOD FOR SEALING BLOW MOLDED BOTTLE

FIELD OF THE INVENTION

The invention relates to apparatus and methods for sealing closed the open necks of blow molded plastic bottles and forming integral breakaway tops.

DESCRIPTION OF THE PRIOR ART

Blow molding, filling and sealing of plastic bottles is conventionally performed by blow molding a bottle in closed mold using an axial blow pin and flowing liquid directly into the molded bottle while confined within the mold. Following filling, either a stopper is inserted into the open neck or supplementary tooling adjacent the neck is actuated to engage, close and seal the neck while forming a breakaway top. The mold halves and tooling are then opened and the filled, sealed bottle is ejected.

Blow molding, filling and sealing bottles within a single mold cavity is a relatively slow and expensive procedure, particularly when compared to the rates at which bottles may be molded using modern multi-station blow molding machines. One station molding, filling and sealing technology does not meet modern production requirements.

SUMMARY OF THE INVENTION

The disclosed invention is an apparatus and method for rapidly sealing previously molded and filled plastic bottles. The apparatus seals as many as 200 filled bottles per minute and may be used in a production line including a blow molding machine and a filler that fills molded bottles as they are moved to the sealing apparatus. Bottles having specialized open necks adapted to be heated and molded closed are also disclosed.

The apparatus includes a plurality of like sealing stations and a drive to move the stations around a continuous path. Filled bottles are accurately positioned on the stations and the tops and the bottoms of their cylindrical log necks are clamped in place. The middle of the neck is then heated to a sufficiently high temperature to permit molding and forming of a seal closing the bottle and forming of a integral twist-off top. A positive pressure is provided within the heated neck to maintain its cylindrical shape and prevent inward sagging and possible contact between the resin in the neck and a heater inserted into the neck.

Following heating of the neck, sealing tooling closes on the neck to form a seal extending across the neck and closing the interior of the bottle. The tooling simultaneously forms a top including an integral twist off handle for opening the bottle.

As the station with the sealed bottle moves along the path the bottle is cooled, the tooling opens and the bottle is ejected at a discharge position. The station is then returned to the loading position, a new filled bottle is placed on the station and the cycle is repeated.

The sealing apparatus is used together with a filling machine capable of filling bottles at the same rate the apparatus seals bottles. Open neck bottles are supplied to the filling machine either directly from a blow molding and trimming line or, alternatively, from a source of previously blown and trimmed bottles.

The present sealing apparatus permits sealing of upright filled bottles independently of the molding operation thereby enabling molding to be performed by modern rotary-type multistation blow molding machines with high production rates. The bottles ejected from these molding machines may be moved through high production trimmers for removing undesired flash and preparing the bottles for either immediate filling and sealing or storage prior to filling and sealing. The physical separation of the molding steps from the filling and sealing steps permits the use of a single molding and trimming facility for manufacturing bottles to be shipped empty to a number of spaced filling and sealing facilities, thereby reducing equipment cost and the cost of transporting heavy, filled and sealed bottles.

The separation of the filling and sealing operation from the molding operation also permits the molded and trimmed bottles to be processed through filling and sealing operations in relatively short production runs as required by low volume specialty customer fillings without the time consuming and expensive necessity of starting and stopping the blow molding operation.

The disclosed sealing apparatus permits sealing of bottles having integral twist off tops in an efficient manner thereby permitting cost reductions by eliminating the use of pre-molded and relatively expensive closures such as conventional separate threaded caps. The use of an integral twist off tops is particularly appropriate for bottles where the entire contents are likely to be poured from the bottle at the time of opening and there is no need to reseal the bottles. When resealing is required, a twist-off top may be provided with a snap-back feature enabling the user to form a temporary seal closing the bottle by snapping the removed top back on to the bottle. The manufacturing flexibility made possible through use of the disclosed separate sealing apparatus enables bottlers to make greater use of the molded twist-off top and permits further savings by elimination of the conventional screw-off cap.

The separation of the blow molding step from the heating and sealing step permits blow molding of the bottles in a rapid multistation vertical rotary blow molding machine and sealing of the molded filled bottles in an upright position. Filled bottles must be sealed when in an upright position. It is not possible to fill and seal the bottles as they rotate in the molds of a vertical rotary blow molding machine.

The apparatus may also be used to seal empty bottles and thereby facilitate relative long-term storage of the bottles in silos or bins prior to subsequent usage. The molded bottles have relatively thin and deformable sidewalls. If stored unsealed the walls are deformed and, with time, assume the deformed, out-of-specification shape. The air confined within empty sealed bottles supports the sidewalls of the bottles and permits storage without appreciable deformation.

Other objects and features of the invention will become apparent as the description proceeds, especially when taken in conjunction with the accompanying drawings illustrating the invention, of which there are six sheets and one embodiment.

DESCRIPTION OF THE PREFERRED EMBODIMENT

Figure 5:
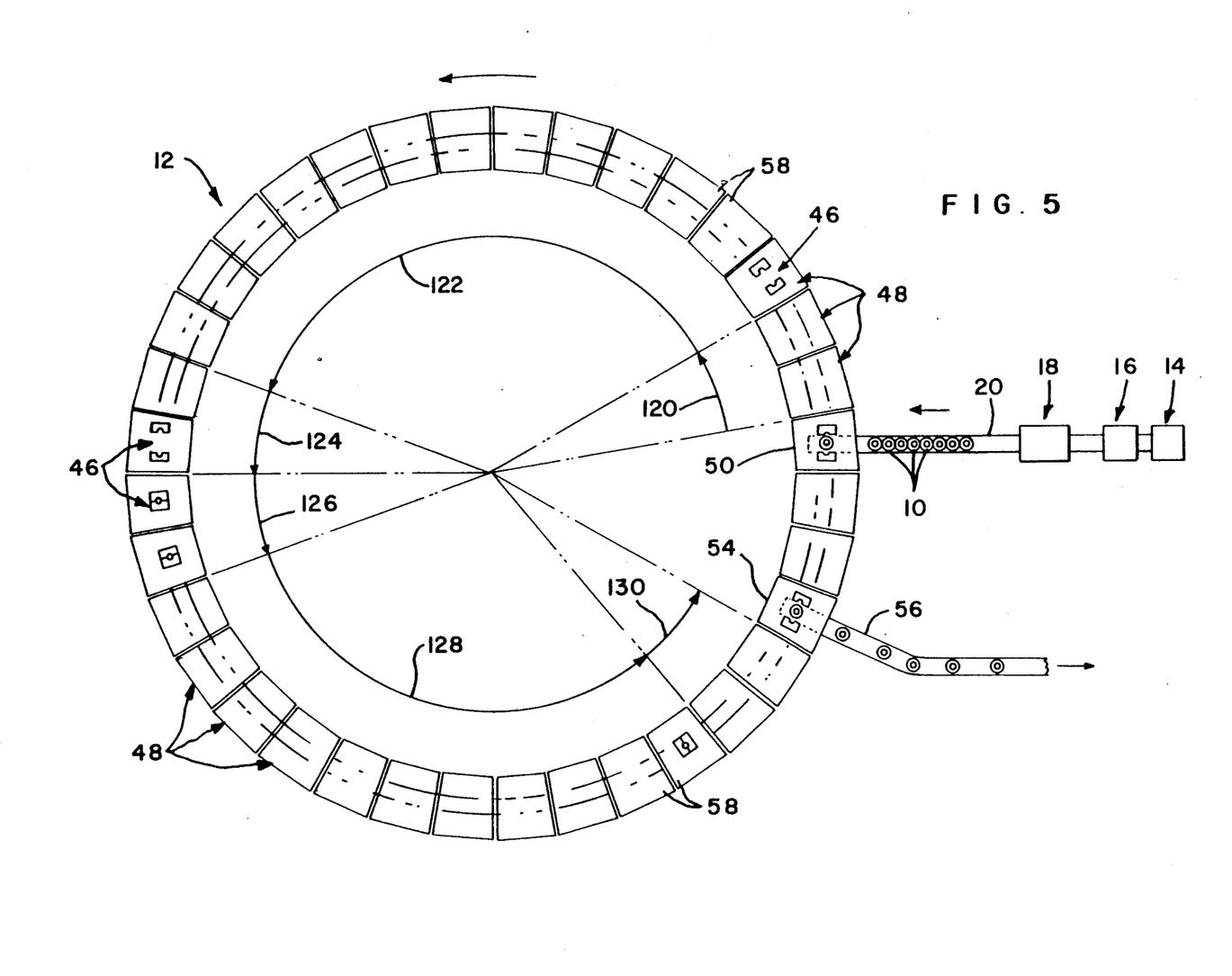
FIG. 5 is a top view of an apparatus for sealing the bottle of FIG. 1.

Bottles 10 are sealed by apparatus 12 shown in FIG. 5. The apparatus may be part of a continuous manufacturing line including a blow molding machine 14 for blowing the bottles, a trimming machine 16 for trimming the bottles and a filling machine 18 for filling the bottles with a liquid. These machines are joined by suitable bottle conveyors. Conveyor 20 moves the filled upright bottles 10 from the filling machine 18 to the sealing apparatus 12.

Figures 1, 2:
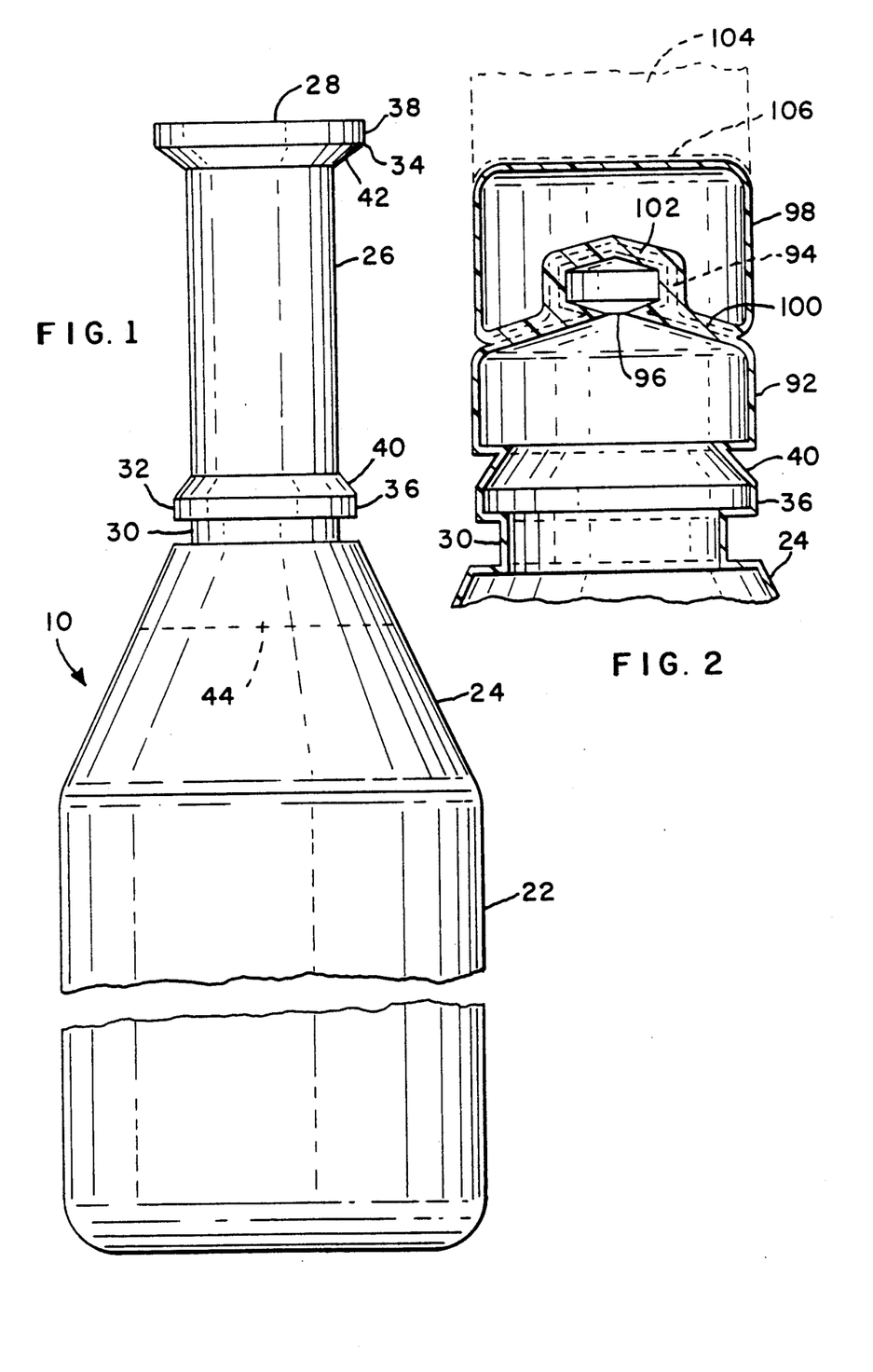
FIG. 1 is a side view, partially broken away, of a filled bottle with an open, unsealed neck.
FIG. 2 is a sectional view through the top of the bottle when sealed.

FIG. 1 shows a filled bottle 10 before sealing. The bottle includes a generally cylindrical body 22, a conical shoulder 24 above the body and a hollow cylindrical hollow log neck 26 extending upwardly above the shoulder to a mouth 28 located at the top of the bottle. A cylindrical clamp groove 30 extends around the bottle at the top of the shoulder 24. The lower wall of the groove is located at the top of the shoulder and the upper wall of the groove is located on lower ring 32 at the bottom of neck 26. Upper ring 34 extends outwardly from the top of the neck 26. Each ring includes a narrow cylindrical portion 36, 38 and a narrow conical flange portion 40, 42 extending radially outwardly from the smaller diameter neck 26. Portions 40 and 42 also extend axially away from neck 26. Filling machine 18 flows liquid into bottle 10 through mouth 28 and neck 26 to fill the bottle to a level 44 slightly below the top of shoulder 24.

The sealing apparatus 12 includes a continuously rotating table supporting thirty-six circumferentially arranged sealing stations 48. The turntable drive (not illustrated) rotates the sealing stations 48 counterclockwise at 5.56 revolutions per minute so that apparatus receives, seals and discharges 200 bottles per minute. Each station carries like heating and sealing tooling 46 as shown in FIG. 5-8.

Conveyor 20 delivers a filled bottle 10 to each work station 48 as the station passes a loading position 50. A suitable transfer mechanism (not illustrated) picks up the lead bottle from the conveyor and places it on the work station with the bottom of the bottle in a support 52 on the station. Other types of bottle supports may be used if desired.

The support assures initial location of the bottle in the station. Following completion of the sealing operation the turntable drive of apparatus 12 moves the work station carrying the sealed bottle to a discharge position 54 where a transfer mechanism (not illustrated) picks up the sealed bottle and places it on discharge conveyor 56 which carries the bottle away from the apparatus.

Each sealing station 48 includes a base plate 58 carrying support 52 and tooling 46 for heating and sealing the bottle neck. This tooling includes lower neck clamp tooling 60 located adjacent the lower end of the neck 26, upper neck clamp tooling 62 located adjacent the top of the neck, sealing tooling 64 located between the upper and the lower clamp neck tooling and adjacent the cylindrical portion of the neck and a neck heater 66 extending through part of the upper neck clamp tooling 62.

The lower neck clamp tooling 60 includes a pair of opposed like jaws 68 each having a semi-circular recess 70 having a shape conforming to the exterior surface of the bottle groove 30 and lower ring 32. Tooling 60 includes a drive (not illustrated) for moving the jaws 68 between an open position shown in FIG. 6 where the jaws are remote from the bottle and a closed position shown in FIGS. 7 and 8 where the jaws are moved into engagement with the bottle and orient and support the bottle in a desired proper location for completion of the sealing operation.

The upper neck clamp tooling includes a pair of exterior clamp jaws 72 having semi-circular recesses 74 at the lower ends thereof conforming to the exterior shape of the narrow conical flange 42 at the top of neck 26. Tooling 62 includes a drive (not illustrated) for moving the clamp jaws 72 between an open position shown in FIG. 6 and a closed clamp position shown in FIGS. 7 and 8. In the closed clamp position the semi-circular recesses 74 engage the exterior surface of flange 42 at the top of the neck.

The upper neck clamp tooling 62 also includes a cylindrical interior clamp 76 having a beveled lower end 78 conforming in shape to the interior surface of the upper flange portion 42 of neck 26. The cylinder clamp 76 is located co-axially with a bottle 10 held in support 52 and is movable bY a suitable drive (not illustrated) between a lower clamp position shown in FIGS. 6, 7 and 8 and an elevated position above and free of the bottle.

Figure 6:
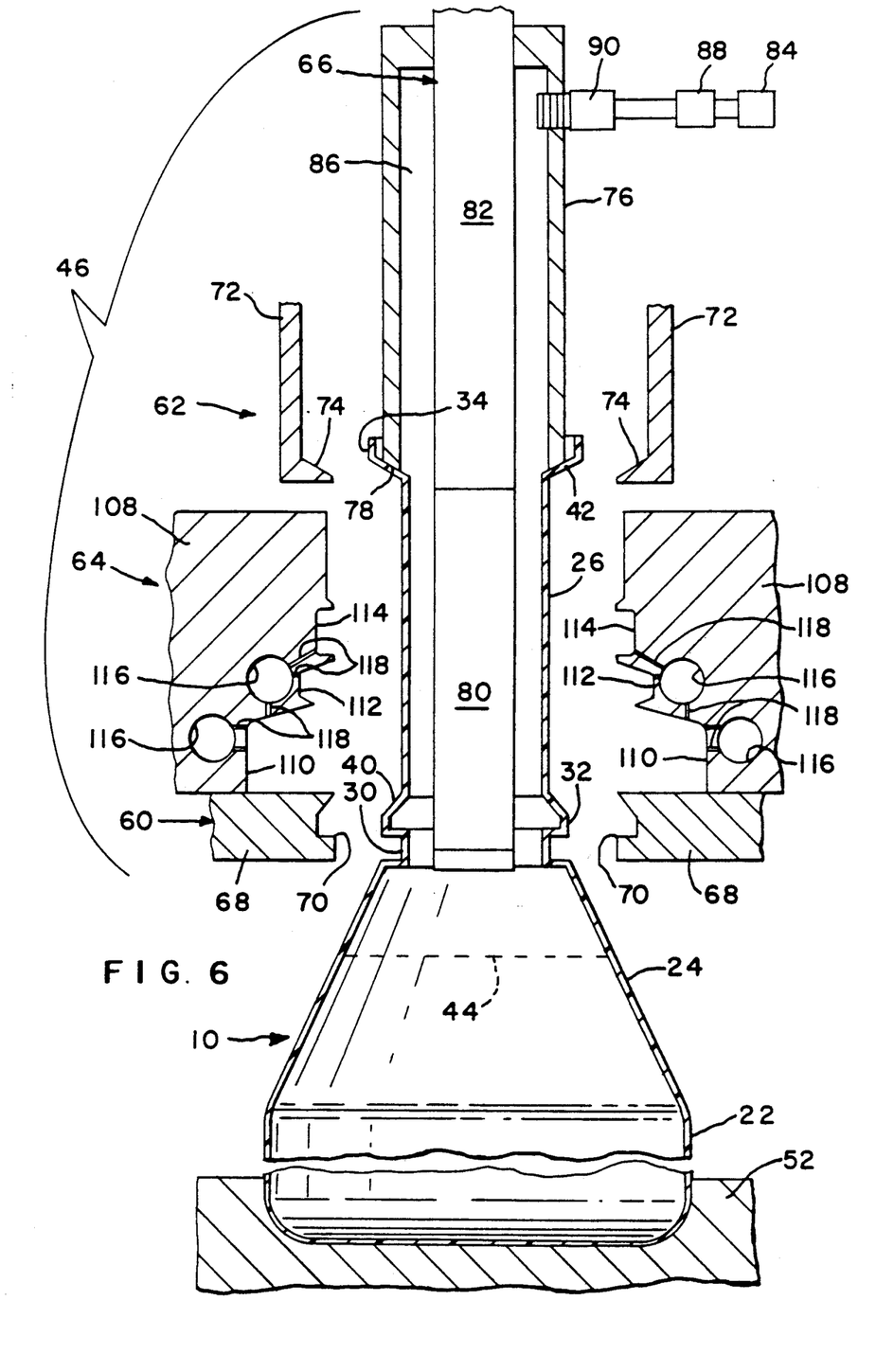
FIGS. 6, 7 and 8 are partially broken away sectional views illustrating sealing the bottle.

Neck heater 66 includes a cylindrical electric quartz heater 80 mounted on the end of a support rod 82 extending through a pressure seal opening in the top of the cylinder clamp 76. The cylinder and rod are located axially with respect to the cylinder clamp 76 and bottle 10. Neck heater 66 includes a drive for moving the heater and rod axially between an extended position in which the heater 80 is located within neck 26 as shown in FIG. 6 and a retracted position in which the heater 80 is withdrawn above the neck and free of the bottle.

A source of low pressure support air 84 is connected to the interior 86 of cylindrical clamp 76 through valve 88 and port 90 located in the upper wall of the clamp.

Bottle 10 is formed from a thermoplastic resin, preferably through a parison blow molding operation, although the bottle can be formed by blow molding using an injection molded preform. The bottle may be made from low density polyethylene, high density polyethylene, polyvinyl chloride or other suitable resin. Multi-layer bottles may be used. These bottles may include barrier or scrap or regrind layers, as required by the particular application and the storage properties required for the bottle or the liquid sealed in the bottle. The wall thickness may be as little as 0.040 inch in the neck area for low density polyethylene bottle. For high density polyethylene or polyvinylchloride bottles the thickness may be as little as 0.020 inch.

Figure 3:
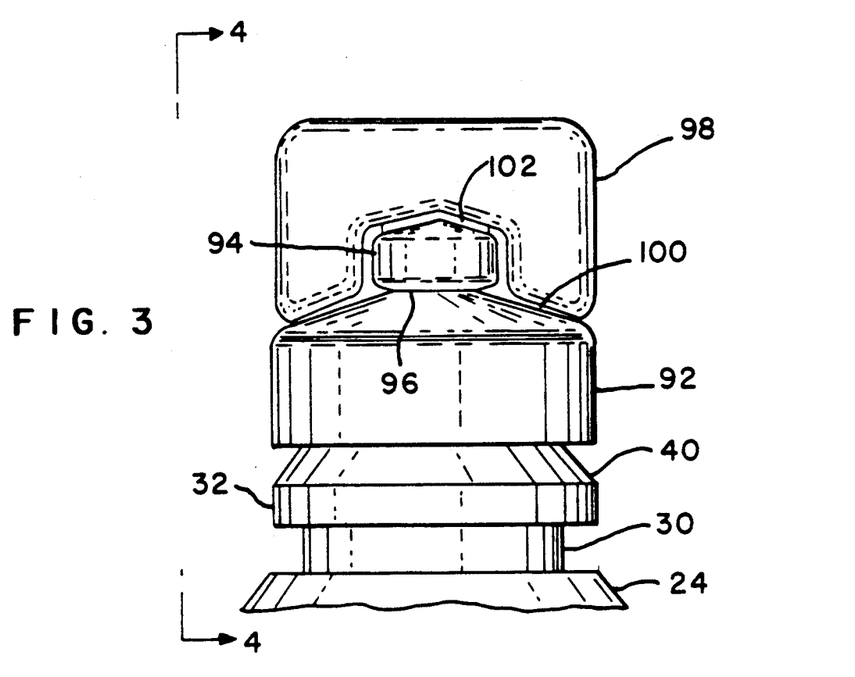
FIG. 3 is a side view of the seal of FIG. 2.
Figure 4:
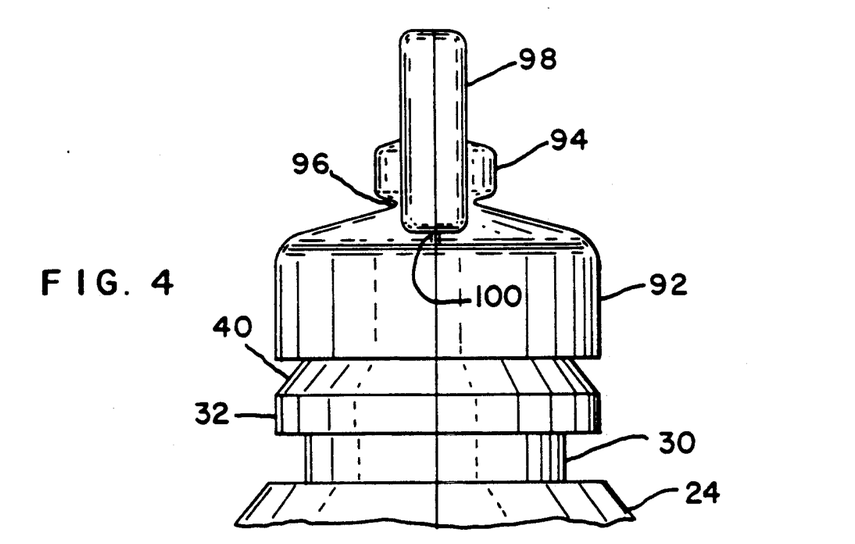
FIG. 4 is a view taken along line 4——4 of FIG. 3.

During sealing of the bottle by apparatus 12 the open cylindrical neck 26 is closed and formed to the shape shown in FIGS. 2, 3 and 4. The sealed bottle includes a major cylindrical dome 92 located above conical portion 40 and a minor cylindrical dome 94 above and coaxial with dome 92. The interiors of domes 92 and 94 are connected at mouth 96.

A flat, hollow U-shaped handle 98 extends across and is joined to both domes 92 and 94. The plastic joint 100 between the handle and the dome 92 is relatively weak while the plastic joint 102 between the handle and the minor dome 94 is relatively strong to permit opening of the sealed bottle 10 by twisting handle 98 and breaking the handle and the minor dome 94 away from the major dome and opening mouth 96 for discharge of the liquid sealed in the bottle. The handle and minor dome form a top which is broken away to open the bottle.

When the bottle is sealed the plastic at the top of neck 26 forms waste 104 connected to handle 98 by flash 106. The waste is easily broken away at the flash.

The neck sealing tooling 64 includes a pair of like mold halves 108 each having recesses 110, 112 and 114 for molding the neck 26 to form major cylindrical dome 92, the minor cylindrical dome 94 and break away handle 98 when the mold halves are closed on the heated neck. The meeting faces in the mold halves between the recesses are shaped to form joints 100 and 102 and 106. Vacuum manifolds 116 in the mold halves are communicated to the recesses 110, 112 and 114 by small diameter vacuum lines 118. Manifolds 116 are connected to a vacuum source (not illustrated).

The operation of sealing apparatus will now be described by following the path of one sealing station 48 from the loading position 50 around the turntable and back to the loading position.

As station 48 is moved past loading position 50 jaws 68, jaws 72 and mold halves 108 are on the open position shown in FIG. 6. The cylindrical clamp 76 is withdrawn directly above the bottle support a distance greater than the height of bottle 10 and rod 82 is vertically withdrawn so that the bottom of the heater is further away from the support than the height of the bottle 10.

With the tooling in the described position the transfer mechanism positions the lead bottle 10 on conveyor 20 in the recess of bottle support 52 with neck 26 located between the open jaws 68 and 72 and open mold halves 108. As the station and bottle are rotated through angle 120 the jaws 68 are moved together, close on the bottom of the neck and extend into clamp groove 30 and around lower ring 32 to hold the bottle in proper orientation for the subsequent sealing operation. Jaws 68 also form a pressure seal with the neck. Clamp jaws 72 are moved from the position of FIG. 6 to that of FIG. 8 to engage the outer surface of conical flange 42 and cylindrical clamp 76 is lowered to engage the inner surface of flange 42 so that the top of the neck is held in place between the jaws and clamp and supported. The clamp 76 forms a seal enclosing the space 86 inside the clamp cylinder and neck.

With the neck clamped at both ends rod 82 is lowered to position the quartz heater 80 within the supported neck 26 as shown in FIG. 6. Following insertion of the heater the tooling is maintained as described during movement of the work station through arc 122.

Radiant quartz heater 80 is preferably tuned to emit infrared radiation in the absorption band of the plastic resin forming neck 26 and thereby to increase the rate at which the emitted energy heats the supported neck. During heating of the neck valve 88 is actuated to connect the low pressure air source 84 to the interior space 86 inside the clamp 76 and neck 26 and above the liquid in the bottle. The positive pressure of the air in this space prevents the softened neck plastic from sagging inwardly and undesirably contacting the heater 80. The relatively cool top of the neck is maintained clamped between jaws 72 and clamp 76 during heating in order to prevent vertical collapse of the neck as it is heated and softened.

At the end of heating cycle as measured by arc 122 the neck has been heated to a temperature sufficiently high to permit molding to seal the bottle and form the top structure of the finished bottle. The amount of positive pressure within the neck during heating is dependent upon the properties of the plastic resin in the neck and the temperature to which the plastic is heated for sealing and may vary from one- half pounds per square inch to as much as two pounds per square inch. In most applications a pressure of one pound per square inch is sufficient to prevent inward sagging of the heated neck. The positive pressure maintained in the neck is not sufficient to blow the neck outwardly into the mold halves 108.

Figure 7:
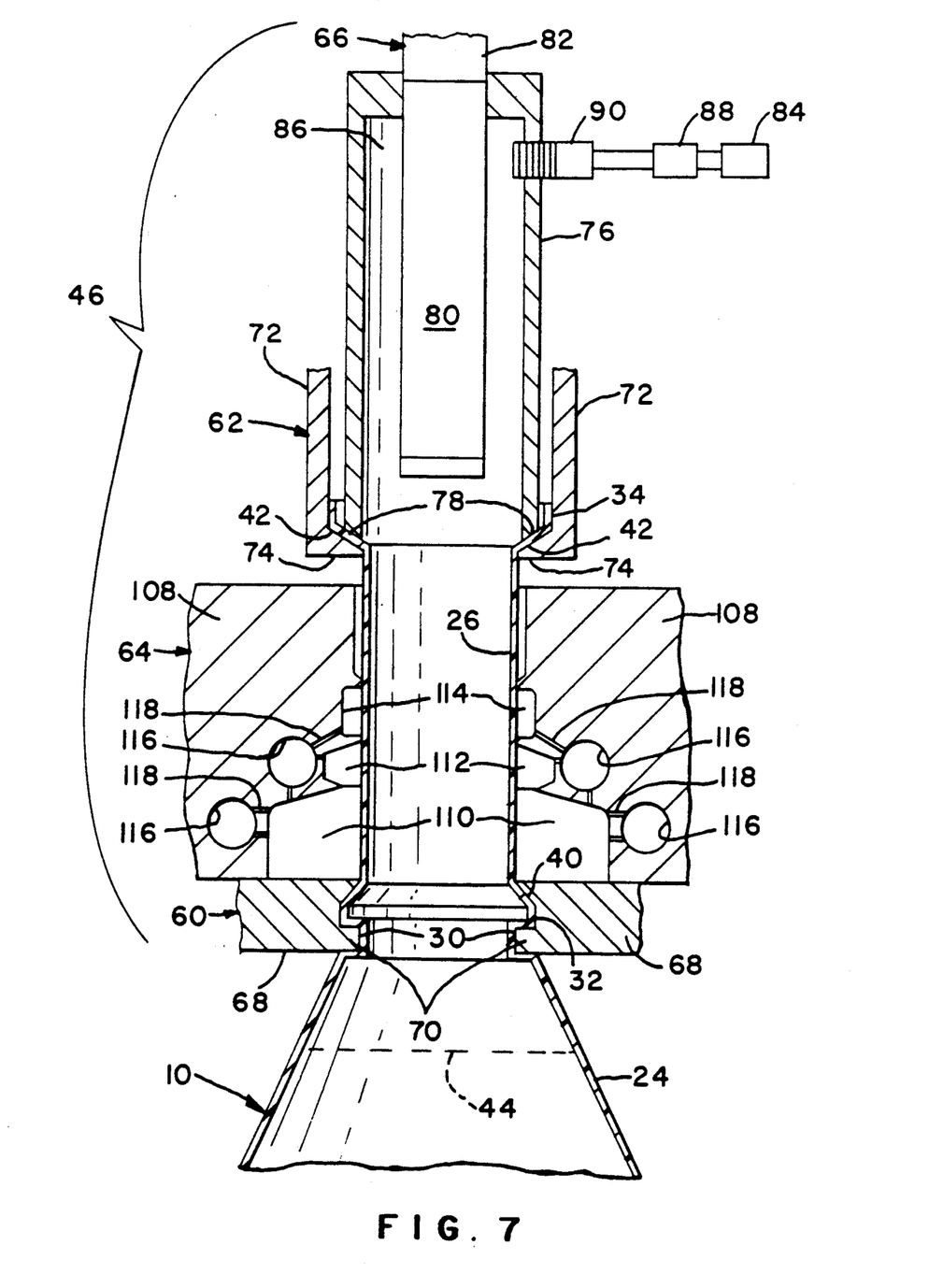
Figure 8:
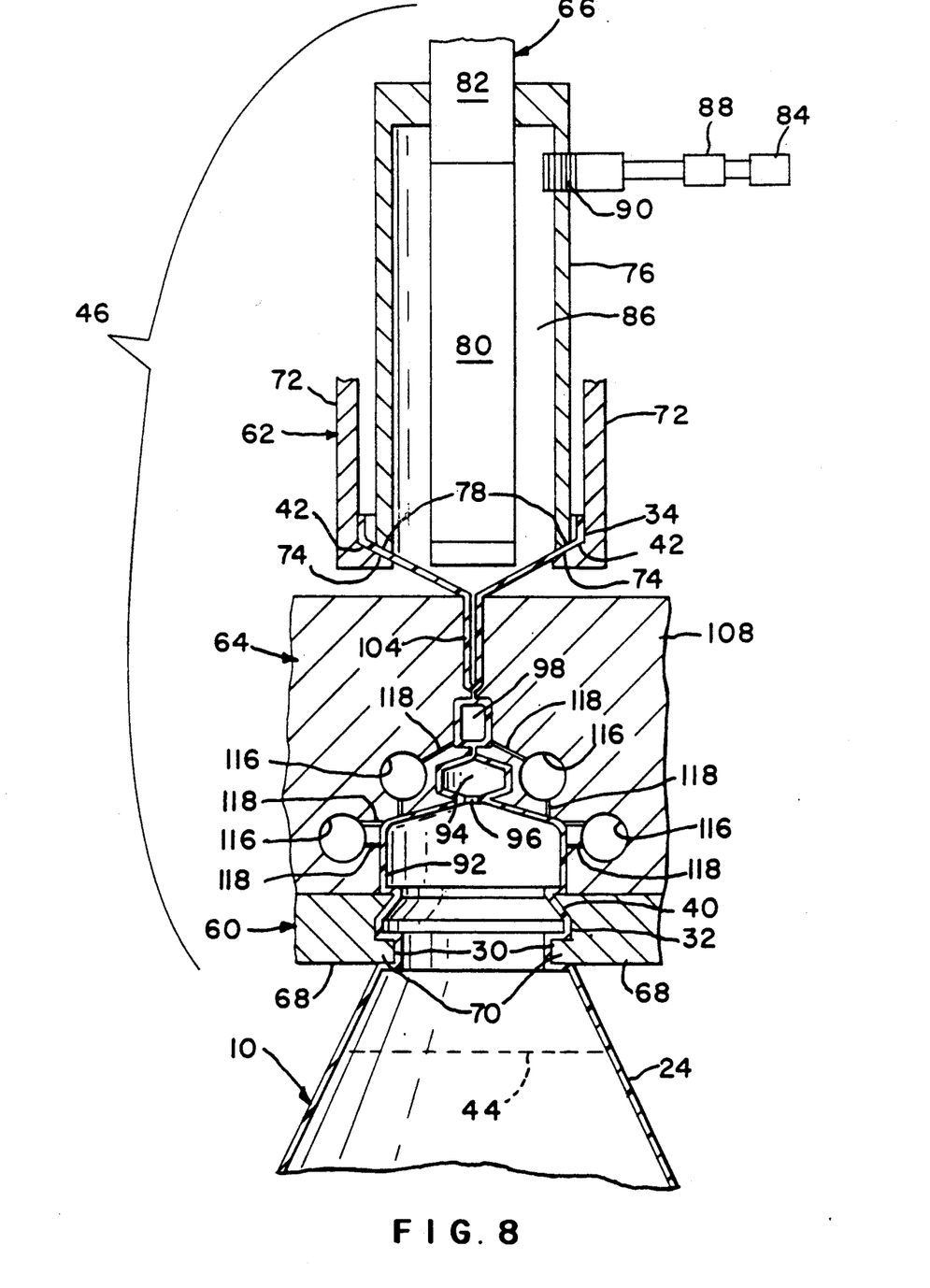

Following heating of the neck the station rotates through arc 124 and the rod 82 is withdrawn to raise heater 80 above the supported neck 26. FIG. 7 illustrates rod 82 in the withdrawn position.

Following withdrawal of the heater the mold halves 108 are closed on the heated and softened neck 26 as station 48 rotates through arc 126. At this time the vacuum manifolds 116 are connected to a vacuum source. The lands at the top of recesses 114 form a seal with the neck plastic and the bottoms of the mold halves form a seal with clamp jaws 68 so that withdrawal of the confined air within the recesses 110, 112 and 114 through lines 118 and manifolds 1 16 reduces the pressure in the recesses and draws the softened plastic into the recesses to form a seal closing the top of the bottle and forming the domes 92 and 94, handle 98, joints 100 and 102 and waste 104 above the handle. The molded plastic resin cools and sets as the station continues to rotate through relatively large arc 128. The molds halves 108, and jaws 68 and 72 open as the station is rotated through relatively small arc 128. At the same time cylinder 76 is raised above the bottle thereby releasing the waste plastic 104. The sealed bottle 10 rests freely on the support 52.

Rotation of the turntable moves the station 48 and sealed bottle to the discharge station 54 where a discharge transfer device picks up the bottle and places it on discharge conveyor 56. Continued rotation of the turntable brings the sealing station back to the loading position 50 for receipt of a further filled bottle 10 and initiation of another sealing cycle.

Sealing apparatus 12 uses a cylindrical quartz heater to heat and soften the plastic in the bottle neck. Alternatively, it is contemplated that the neck may be heated and softened using an external heater which essentially surrounds the supported neck and radiates energy into the neck. In some cases an external heater and a rod heater may be used together where relatively high energies are required to heat and soften the neck resin.

Apparatus 12 as described is used to seal a bottle filled with liquid. The apparatus 12 may also be used to seal empty bottles as required. For instance, it may be desirable to seal empty blow molded bottles where the bottles are stored for a period of time and must be sealed closed in order to maintain their shape prior to filling.

Apparatus 12 includes a number of stations 48 which move around a continuous circular path. It is contemplated that the stations may move around paths of different geometries. For instance, stations may move along a linear path extending between the loading and discharge stations. After discharge the sealed bottle the station would return rapidly to the upstream loading station. Other shaped paths may be used as required.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim as my invention is:

1. Apparatus for sealing the hollow neck of a preformed plastic bottle, the apparatus comprising
   a. neck sealing tooling including mold means surrounding the neck and defining at least one cavity when closed, and first drive means for moving the mold means between open and closed positions;
   b. lower neck clamp tooling located below the neck sealing tooling and including lower clamp means for engaging and supporting the bottom of the neck, and second drive means for moving the lower clamp means between opened and closed positions;
   c. upper neck clamp tooling located above the neck sealing tooling and including upper clamp means for engaging and supporting the top of the neck and third drive means for moving the upper clamp means between opened and closed positions; and
   d. a heater for raising the temperature of a bottle neck held between the upper and lower clamp means sufficiently high to permit molding and sealing by the neck sealing tooling, and fourth drive means for moving the heater between a position adjacent the neck and a position remote from the neck.

2. Apparatus as in claim 1 including a vacuum manifold opening into the walls of at least one cavity and a vacuum seal between the mold means and the lower clamp jaw means when both are closed.

3. Apparatus as in claim 2 wherein said upper clamp means comprise clamp jaws engagable with the outer surface of the top of the neck.

4. Apparatus as in claim 3 including sealing means engagable with the top of the neck for closing the interior of the neck, a source of pressurized air, a port opening into the interior of the neck and an air line connecting the source and the port.

5. Apparatus as in claim 4 wherein the air from the source has a pressure sufficient to prevent inward sag of the middle of the neck when heated.

6. Apparatus as in claim 5 wherein the pressure is between about ½ to 2 pounds per square inch.

7. Apparatus as in claim 4 wherein the sealing means comprises an end engagable with a circumferential flange extending around the top of the neck.

8. Apparatus as in claim 7 wherein the end extends inside the neck.

9. Apparatus as in claim 8 wherein the sealing means is a tubular body and includes a circular end engagable with an interior surface of the neck and the port extends through the tubular body.

10. Apparatus as in claim 9 including a rod extending through the interior of the tubular member, said heater being attached to the end of the rod adjacent the neck and the fourth drive means is attached to the other end of the rod.

11. Apparatus as in claim 1 wherein the heater is located outside the neck.

12. Apparatus as in claim 1 wherein said heater is located within the interior of the neck.

13. Apparatus as in claim 1 wherein the heater emits infrared radiation in the absorption band of the resin forming the bottle neck.

14. Apparatus as in claim 1 wherein said lower clamp means comprises a pair of opposed jaws each having a semi-circular clamp recess engagable with the bottom of the neck when closed.

15. Apparatus as in claim 1 wherein said neck sealing tooling when closed defines a cavity for forming a breakaway handle on the top of the bottle and a cavity for forming a breakaway dome integral with the handle and having a hollow interior communicating with the interior of the bottle, vacuum manifolds opening into both said cavities, and a vacuum seal between the mold means and the lower clamp jaw means when both are closed.

16. Apparatus for sealing closed the necks of previously molded plastic bottles including
   (a) a plurality of like sealing stations; and
   (b) a drive for moving the stations around a continuous path from a bottle loading position to a bottle discharge position and back to the bottle loading position;
   (c) each station including
      (i) a bottle support for receiving and orienting a bottle in the station,
      (ii) neck sealing tooling located above the bottle support defining a mold cavity,
      (iii) lower neck clamp tooling located below the neck sealing tooling,
      (iv) upper neck clamp tooling above the neck sealing tooling, and
      (v) a heater for softening the neck for molding by the neck seal tooling to close the neck.

17. Apparatus as in claim 16 including a vacuum manifold communicating with the cavity and a vacuum seal between the neck seal tooling and the lower neck clamp tooling.

18. An apparatus as in claim 17 wherein said neck sealing tooling includes an upper first mold cavity for forming a twist-off handle at the top of the bottle, a dome cavity located below the top cavity, a wide clearance between said cavities for forming a strong plastic joint joining the molded handle and dome and a narrow clearance between the handle and dome and the remainder of the bottle to facilitate twist-off of both the handle and dome to open the bottle.

19. Apparatus as in claim 17 wherein the path is circular.

20. Apparatus as in claim 19 including a turntable, said stations being mounted around the circumference of the turntable and including drive means for rotating the turntable to move the station between the bottle loading and bottle discharge positions.

21. Apparatus as in claim 20 wherein said drive means rotates the table at a fixed speed.

22. Apparatus as in claim 21 wherein the speed is sufficient to seal approximately 200 stations per minute.

23. Apparatus as in claim 17 wherein each station includes a rod, the heater being located on the end of the rod and heater drive means for moving the rod between an extended position in which the heater is located within the interior of a bottle neck and a retracted position in which the heater is withdrawn away from the bottle neck.

24. Apparatus as in claim 17 wherein in each station the upper neck clamp tooling includes a seal for closing the top of the neck, a source of pressurized air and a port in such tooling and a line communicating the source and the port.

25. Apparatus as in claim 24 wherein said source has a pressure of about ½ to 2 pounds per square inch.

* * * * *

UNITED STATES PATENT AND TRADEMARK OFFICE
CERTIFICATE OF CORRECTION

PATENT NO. : 5,054,272
DATED : October 8, 1991
INVENTOR(S) : Dennis L. Dundas

It is certified that error appears in the above—identified patent and that said Letters Patent is hereby corrected as shown below:

On the title page: Item [54] and Col. 1, lines 1-2, should read

--Apparatus for Sealing Blow Molded Bottle--.

In the Abstract:

Line 2, after "of", insert --a--.

Column 1, line 13, insert --a--, before "closed".

Column 2, line 26, delete "tops" and substitute --top--.

Column 3, line 39, after "that", insert --the--.

Column 4, line 25, change "bY" to --by--.

UNITED STATES PATENT AND TRADEMARK OFFICE
CERTIFICATE OF CORRECTION

PATENT NO. : 5,054,272

DATED : October 8, 1991

INVENTOR(S) : Dennis L. Dundas

It is certified that error appears in the above-identified patent and that said Letters Patent is hereby corrected as shown below:

Column 6, line 64, delete "would".

Column 6, line 64, change "return" to --returns--.

Signed and Sealed this

Twentieth Day of April, 1993

*Attest:*

MICHAEL K. KIRK

*Attesting Officer*  Acting Commissioner of Patents and Trademarks